Figure 1:
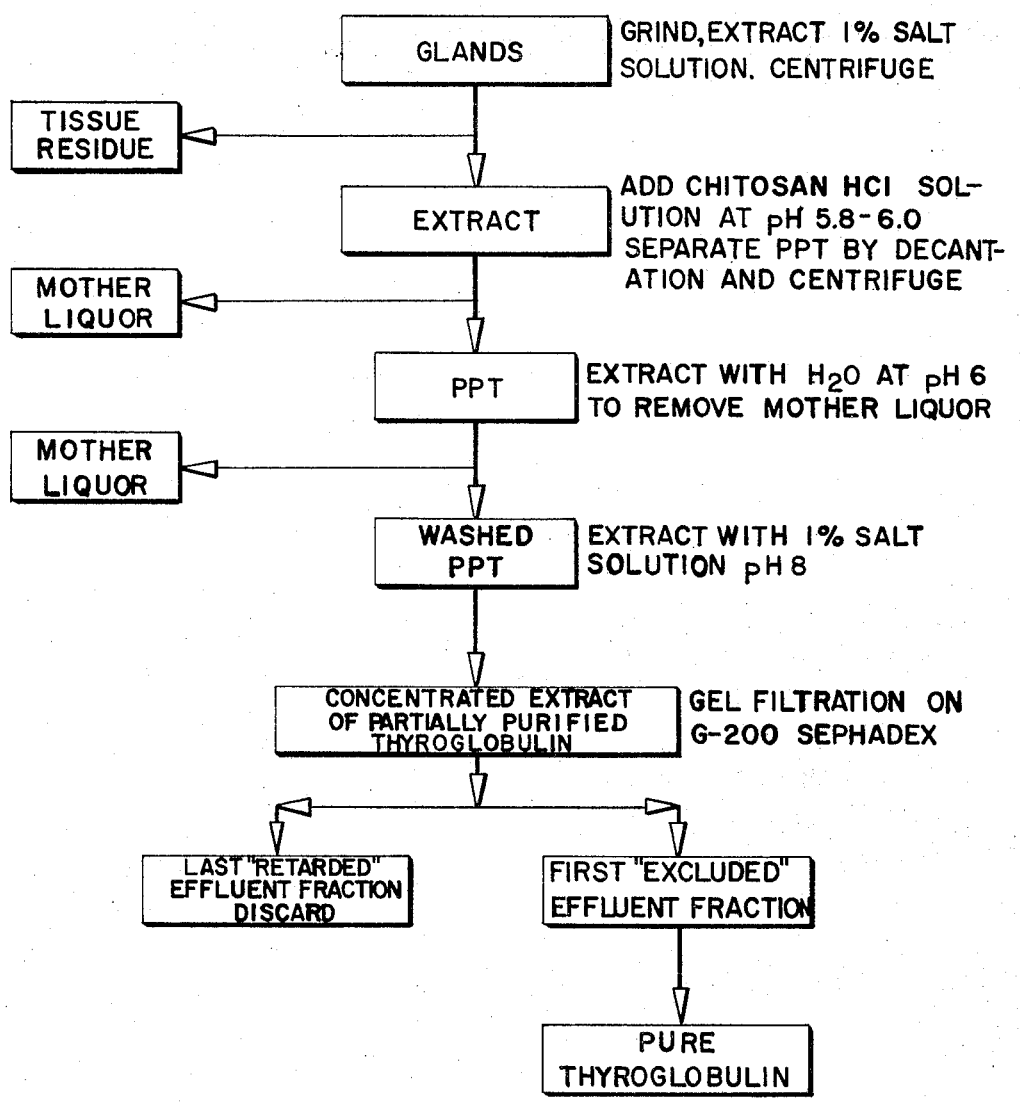

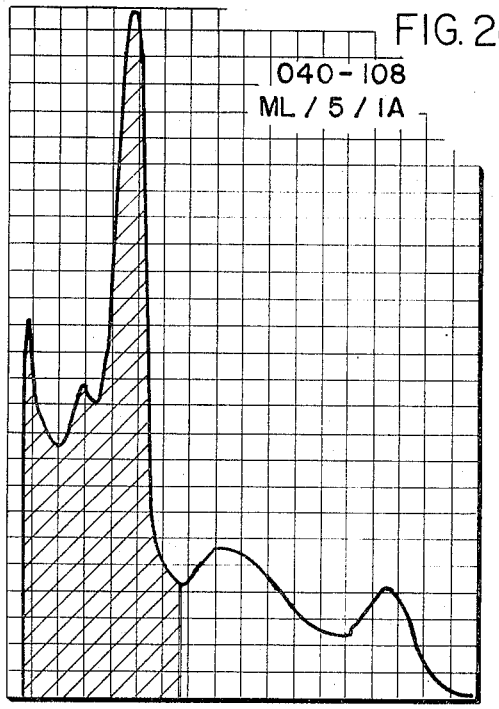
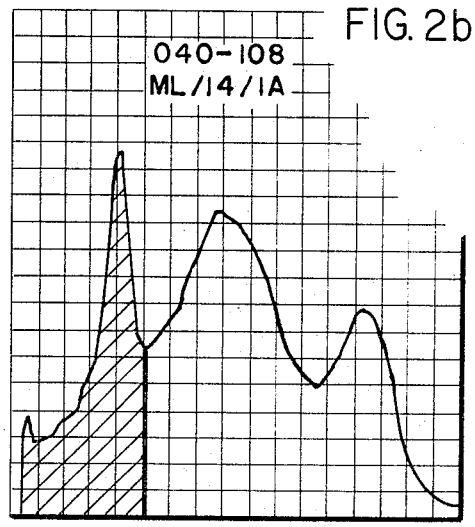
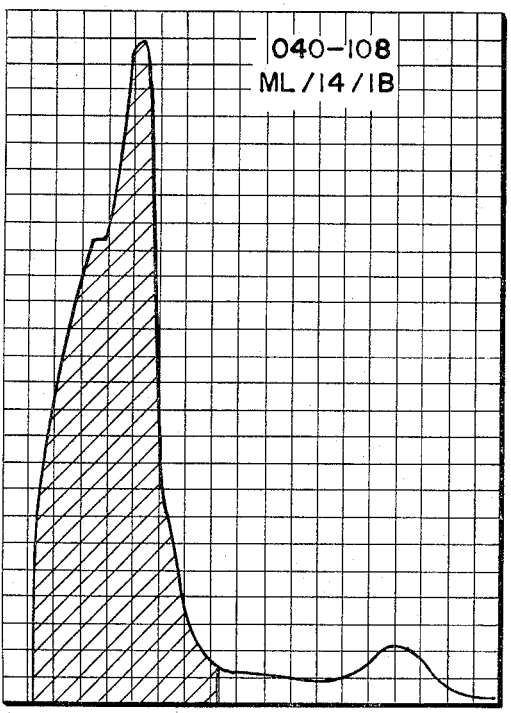
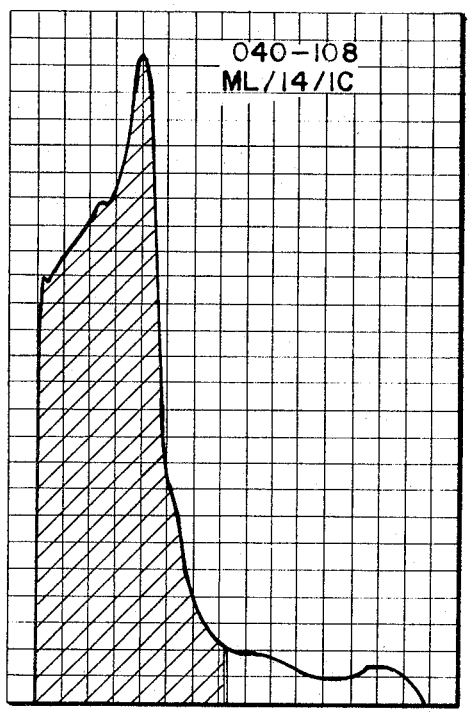
FIG. 2

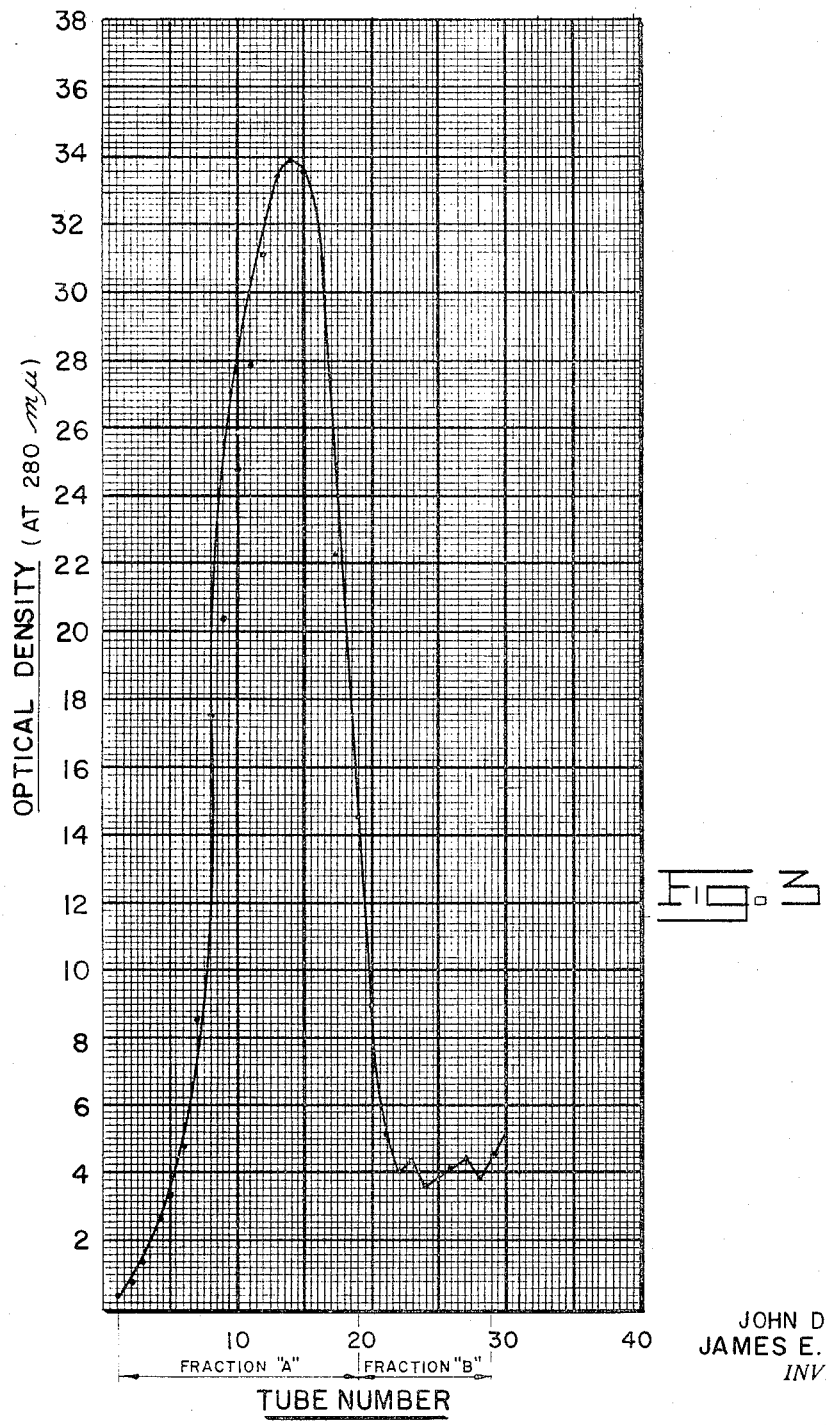

United States Patent Office 3,368,940
Patented Feb. 13, 1968

3,368,940
PROCESS FOR THE ISOLATION AND PURIFICATION OF THYROGLOBULIN
James E. Turner, Jr., and John Doczi, Morristown, N.J., assignors to Warner-Lambert Pharmaceutical Company, Morris Plains, N.J., a corporation of Delaware
Filed Apr. 20, 1964, Ser. No. 361,142
4 Claims. (Cl. 167—76)

This invention relates to a process for the extraction of thyroglobulin. More particularly, it relates to methods for the isolation of thyroglobulin from thyroid glands and for the purification of the isolated thyroglobulin so as to obtain a highly purified undenatured soluble thyroglobulin preparation suitable for therapeutic uses.

Thyroglobulin is present in the thyroid glands of animals and may be extracted therefrom. Under physiological conditions, thyroglobulin is hydrolysed by proteolytic enzymes into its constituent amino acids, including mono- and di-iodotyrosine, thyroxine, and tri-iodothyronine, the latter two of which are essential for biological activity. Thyroid deficiency causes myxedema characterized by dry skin, loose hair and so on. This deficiency may be cured by the administration of thyroxine or thyroglobulin. Thyroglobulin is generally preferred since it contains all of the naturally-occurring iodinated amino acids known to be required for therapeutic efficacy.

Generally, thyroglobulin of commerce is obtained by extracting thyroid glands according to the procedure described by Shulman et al., J. Immunol., 75, 291 (1955), with some minor variations. In essence, minced thyroid glands are extracted with 1% saline and the tissue residue is discarded. The saline extract containing the desired thyroglobulin and other soluble proteins is adjusted to a pH of about 4 resulting in the precipitation of most of the proteinaceous materials in the form of a stable colloidal suspension. This colloidal suspension is heated to effect its conversion to a filterable precipitate. The precipitate formed on heating is filtered, dried and, after standardization, may be incorporated into different dosage forms for oral administration.

It has been found that thyroglobulin obtained as described contains a high proportion of other proteinaceous materials which have no significant biological activity. These proteinaceous materials include, for example, serum proteins, nucleoproteins and so on. In addition, the heat treatment used for the precipitation of thyroglobulin denatures thyroglobulin with the result that it is no longer soluble in water. This insolubility is disadvantageous because it hinders further purification of the thyroglobulin, and its analysis by physico-chemical methods to establish its purity.

Accordingly, it is a primary object of the present invention to provide a method for the production of an undenatured water-soluble thyroglobulin.

It is another object of this invention to provide a method for purifying crude thyroid-extracts to yield a product having a high degree of homogeneity.

A further object of this invention is to provide an integrated process for the extraction of thyroglobulin from thyroid glands, the isolation and purification of the extract and the recovery of a water-soluble highly purified thyroglobulin preparation from it in high yields.

Other objects and advantages will become apparent from the following detailed description.

The aforesaid objects are obtained in a new and novel manner by an integrated process involving the steps of clarifying the saline extract of thyroid glands by supercentrifugation, selectively isolating a partially purified thyroglobulin from the extract, in a concentrated form, and then effecting its final purification by chromatography on a medium which acts like a molecular sieve.

For the selective isolation and concentration of the thyroglobulin, we have found the use of chitosan particularly useful.

Chitosan is an insoluble amino-polysaccharide having the structural formula:

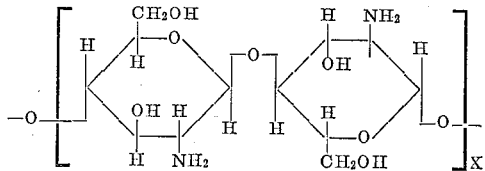

in which X is about 20–500. Chitosan is a weak base with a $pK_a$ value of approximately 6.2 and it forms salts of varying solubility with most inorganic and organic acids. Thus, for example, the hydrochloride of chitosan is readily soluble in water up to pH 6.3–6.4, above which, however, it is converted into the insoluble chitosan base. These properties make chitosan ideally suited for the isolation of thyroglobulin, since at pH 5.8–6.0 thyroglobulin carries a net negative charge, its isoelectric point being at pH 4.5. Hence in the pH range of 5.8–6.0, thyroglobulin will react with the positively charged chitosan, forming an insoluble complex. Furthermore, since chitosan is completely insoluble above pH 7, thyroglobulin can be extracted with a 1% salt solution at pH 8 or other aqueous solvents such as water at pH 8, from its chitosan complex in the form of a concentrated solution suitable for chromatography. This isolation procedure has also been found to be selective, yielding a partially purified thyroglobulin preparation as a result of the fact that most of the contaminating plasma proteins present in a thyroid extract are either uncharged or positively charged at pH 5.8–6.0, having isoelectric points in the range of 5–8 and hence these proteins do not react with the positively charged chitosan. The concentrated partially purified thyroglobulin extract obtained by this procedure can then be passed through a column containing a cross-linked dextran gel acting as a molecular sieve. The success of the purification of this partially purified material by this method depends on the surprising discovery that most of the impurities present in the extract have a molecular weight below 200,000 while the molecular weight of pure thyroglobulin is close to 700,000. The passage of the saline solution containing crude or partially purified thyroglobulin through a column packed with a material which acts as a molecular sieve results in the separation of pure thyroglobulin from the impurities. It has been found that dextran modified by crosslinking is the most effective material which can be used in the column as a sieve for this separation.

Dextran is obtained by fermentation of sugar. The linear macromolecules of dextran are cross-linked to produce a three-dimensional network of polysaccharide chains. Generally speaking, a high degree of cross-linkage creates a compact structure with low porosity whereas a low degree of cross-linkage produces a highly porous structure. Thus, the one most suitable for the practice of this invention is the one having the least amount of cross-linkage. This is available commercially under the trade name of Sephadex G–200, a product of Pharmacia, New York, N.Y. In use, the modified dextran is stirred with water and the gel allowed to settle and the supernatant is decanted. The hydrated gel is resuspended in water to form a thick slurry and is then poured into a column of suitable dimensions. The rationale of the separation of thyroglobulin from lower molecular weight impurities is based on the fact that when a thyroid extract is passed through the column, impurities having a low molecular weight are retarded in the pores of the gel, while the much higher molecular weight, thyroglobulin, is excluded from the gel particles and hence diffuses through the solvent, exterior to the gel particles, at a much faster rate than the retarded lower molecular weight impurities.

In practice, the clarified concentrated extract is poured on top of the column, acting as a molecular sieve, and is then continuously washed through the column with an appropriate solvent such as water, saline or phosphate buffer. The effluent is generally collected in small fractions and analyzed for protein distribution by optical density determination with wave length set at about 280 mµ employing an instrument such as the Beckman DU spectro-photometer. When the optical densities of the various effluent fractions are plotted against the volume of the effluent, a curve will be obtained (see FIG. 3) which shows two peaks representing the "excluded" thyroglobulin and the "retarded" impurities, respectively. The effluents in the first fraction, containing the desired end-product are pooled and may be dialyzed against distilled water and subsequently lyophilized. Lyophilized products thus obtained may then be analyzed by starch-gel electrophoresis using a standard thyroglobulin preparation as control to determine the effectiveness of the process.

The foregoing steps may be conveniently represented by the accompanying schematic diagram identified as FIG. 1.

As shown in FIG. 1, the first step involves the extraction of minced thyroid glands with saline. The saline extract after removal of "tissue residue" is treated with chitosan hydrochloride to yield a chitosan-thyroglobulin complex precipitate from which a partially purified thyroglobulin is then recovered. Finally, the partially purified thyroglobulin is re-dissolved and the solution is separated into pure thyroglobulin and other impurities by gel-filtration.

In order to further illustrate the practice of the present invention, the following examples are given:

EXAMPLE 1

*Selective isolation of thyroglobulin via the chitosan complex*

0.500 gram chitosan (available, for example, under the trade name Kylan, a product of Moretex Chemical Products, Inc.) is dissolved in 40 ml. 0.1 N HCl. The solution is filtered and diluted with 13 ml. 5 N HCl in order to adjust it to 1.3 N HCl concentration. The precipitated chitosan hydrochloride is centrifuged, washed with acetone and dried in vacuum at room temperature over calcium chloride.

100 mg. of the chitosan hydrochloride are dissolved in 2 ml. distilled water. The pH of the solution is adjusted to 5.9 and the volume of the solution to 3 ml. The pH of 5 ml. of a saline extract of hog thyroid glands is adjusted to 6.0 and is then mixed with 1 ml. of the chitosan hydrochloride solution. A rapidly settling precipitate forms which is readily separated from the brilliantly clear mother liquor and is extracted four times with 1% salt solution at pH 8.

Aliquots of the input saline thyroid extract, the mother liquor obtained after precipitation of the chitosan-thyroglobulin complex, and of each of the pH 8 saline extracts are lyophilized and subjected to analysis by starch gel electrophoresis. The electrophoretic patterns are evaluated with the help of an integrating densitometer in order to determine the thyroglobulin concentration in each fraction analyzed. The data obtained are shown in Table I and in the accompanying figures identified as FIG. 2, FIG. 2a, FIG. 2b and FIG. 2c.

TABLE I

| Fraction Analyzed | | Amount | Solids Total | Thyroglobulin | | |
|---|---|---|---|---|---|---|
| Code 040-108 | Description | | | Percent | Mg. | Percent yield |
| ML/5/1A | Input: Extract of thyroid glands | 5.0 ml | 302.0 | 65 | 193 | 100 |
| ML/14/1A | Mother liquor of the chitosan-thyroglobulin complex precipitate. | 5.5 ml | 123.8 | 25 | 31 | 16 |
| ML/14/1B | First Saline extract of the chitosan-thyroglobulin complex. | 1.6 ml | 143.2 | 85 | 122 | 65 |
| ML/14/1C | Second Saline extract of the chitosan-thyroglobulin complex. | 0.9 ml | 27.6 | 87 | 24 | 12 |
| ML/14/1D | Third Saline extract of the chitosan-thyroglobulin complex. | 1.1 ml | 18.4 | 90 | 16 | 8 |
| ML/14/1E | Fourth Saline extract of the chitosan-thyroglobulin complex. | 0.9 ml | 10.3 | 90 | 9 | 4 |
| F | Chitosan protein residue | 58.5 mg | 58.5 | | | |

The data presented in Table I and FIG. 2 indicate that by the process described the following is achieved:

(1) The purity of the isolated thyroglobulin is increased from 65% to 85–90%.
(2) The overall yield is 89%.
(3) 65% of the thyroglobulin contained in the initial extract is obtained in the form of a 7.6% solution which represents an approximately two-fold concentration increase over the input extract.

EXAMPLE 2

*Purification of thyroglobulin by gel filtration*

Frozen hog thyroid glands are mixed with solid $CO_2$ and the mixture homogenized in a Waring Blendor. 90 gms. of the coarse powder obtained are stirred for 18 hours with 300 ml. of 0.9% NaCl solution at 0° to 4° C. and the mixture strained through glass wool and centrifuged for 20 minutes at 28,000× gravity. This clarification procedure is repeated once more by straining the extract through glass wool and centrifugation at 24,000× gravity for 30 minutes.

15 gm. Sephadex G-200 (40–120µ particles size) is stirred with 1 liter distilled water and the gel allowed to settle. The cloudy supernatant, containing "fine" particles is discarded and this procedure repeated twice. The settled gel is suspended in enough water to form a thick slurry and is poured into a chromatography column of 4 cm. diameter. The height of the column—after equilibration with 0.9% NaCl solution—is 37 cm.

To this column there is applied 100 ml. of the clarified thyroid extract which is washed through the column with 0.9% NaCl solution. The effluent is collected in 49 ten ml. fractions and analyzed for protein concentration by optical density determination at 280 mµ.

The pattern obtained for the first 30 fractions is shown in FIG. 3. Fractions contained in tube Nos. 1 to 19 and those in Nos. 25 to 37 are pooled and each composite dialyzed against distilled water which is changed twice daily over a period of five days. Finally, the dialyzed solutions are lyophilized yielding a 2.3151 gm. fraction identified as the *a* fraction, representing tube Nos. 1–19, and a 0.1906 gm. fraction further identified as the *b* fraction, representing tube Nos. 25–37. Fraction *a* is identified as thyroglobulin by starch gel electrophoresis, while fraction *b* is found to be substantially free of thyroglobulin. Chemical analysis of fraction *a* showed 12.53% N, 1.65% I and 0.37% ash content.

It is to be understood that the foregoing detailed description is given merely by way of illustration and that many variations may be made therein without departing from the spirit of our invention.

Having described our invention, what we desire to secure by Letters Patent is:

1. Process for selectively isolating a partially purified thyrogobulin from a crude extract of thyroid glands which comprises contacting a solution of chitosan having a pH of from 4.8 to 6.5 with said crude extract of thyroid glands and recovering an insoluble chitosan-thyroglobulin complex therefrom.

2. Process for recovering partially purified thyroglobulin from a chitosan-thyroglobulin complex obtained in accordance with claim 1 which comprises contacting said complex with an aqueous solvent having a pH of about 8 and separating the insoluble precipitate from the mother liquor containing the thyroglobulin.

3. Process in accordance with claim 2 wherein said aqueous solvent is 1% salt solution.

4. Process for recovering thyroglobulin from a crude extract of thyroid glands which comprises:
(a) contacting a solution of chitosan having a pH of from 4.8 to 6.5 with said crude extract of thyroid glands;
(b) recovering an insoluble chitosan-thyroglobulin complex therefrom;
(c) contacting said chitosan-thyroglobulin with an aqueous solvent having a pH of about 8;
(d) removing the insoluble precipitate from the mother liquid therefrom, to obtain a partially purified thyroglobulin;
(e) passing said partially purified thyroglobulin through a column containing cross-linked dextran gel, which excludes moieties having a molecular weight approximately above 200,000;
(f) eluting said column with an aqueous solvent; and
(g) recovering pure thyroglobulin from those effluents representing the gel-excluded fractions.

References Cited

Gelotte, J. of Chromatography, vol. 3, January–June 1960, pages 330, 331, 332, 340, 341 and 342.

Johansson et al.: Acta. Chem. Scand., vol. 16, 1962, pages 2067 and 2068.

SAM ROSEN, *Primary Examiner*.